Jan. 11, 1966    H. C. GALLAHER ET AL    3,228,631
CONTROL POSITIONS INDICATOR FOR USE WITH GYRO INSTRUMENTS
Filed May 15, 1963    3 Sheets-Sheet 1
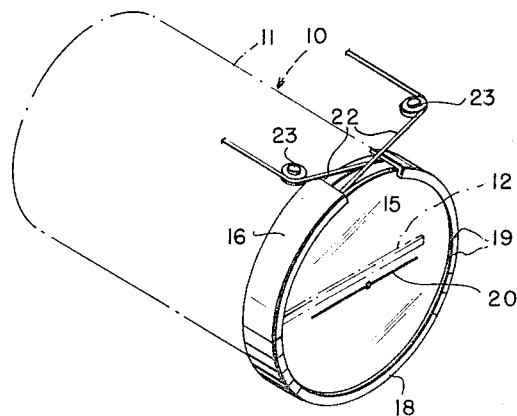
FIG__1
FIG__2
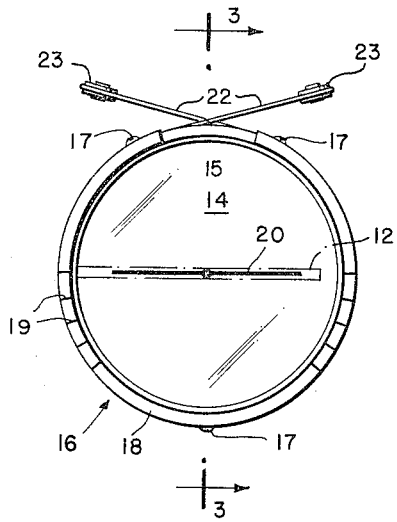
FIG__3
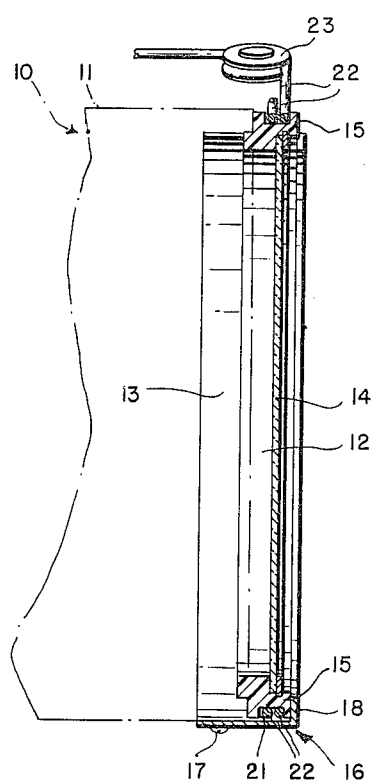
JOHN J. GALLAHER
HERMAN C. GALLAHER
*INVENTORS*
BY 
*ATTORNEYS*

Jan. 11, 1966    H. C. GALLAHER ET AL    3,228,631
CONTROL POSITIONS INDICATOR FOR USE WITH GYRO INSTRUMENTS
Filed May 15, 1963    3 Sheets-Sheet 2
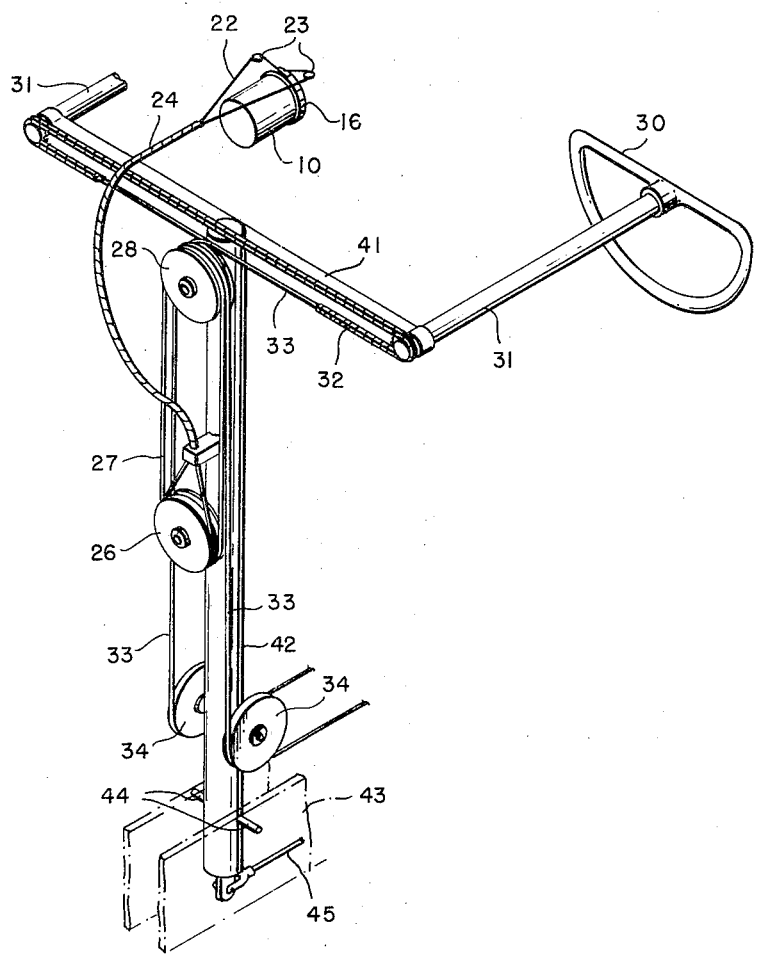
FIG.___4
JOHN J. GALLAHER
HERMAN C. GALLAHER
INVENTORS
BY Seed & Berry
ATTORNEYS Jan. 11, 1966  H. C. GALLAHER ET AL  3,228,631
CONTROL POSITIONS INDICATOR FOR USE WITH GYRO INSTRUMENTS
Filed May 15, 1963  3 Sheets-Sheet 3
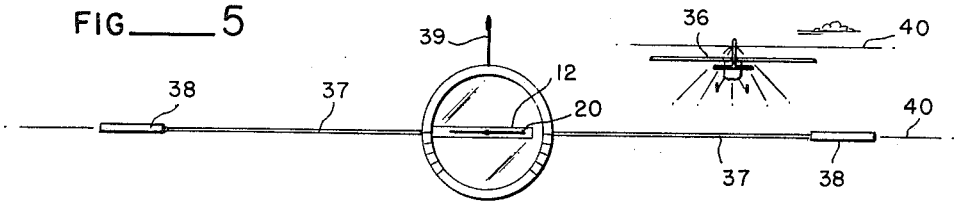
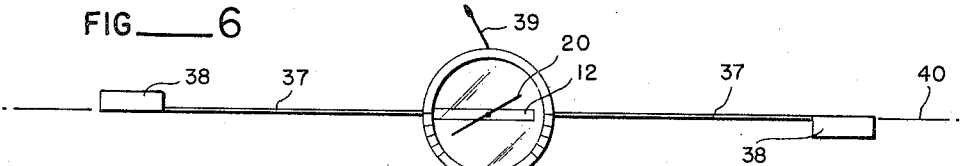
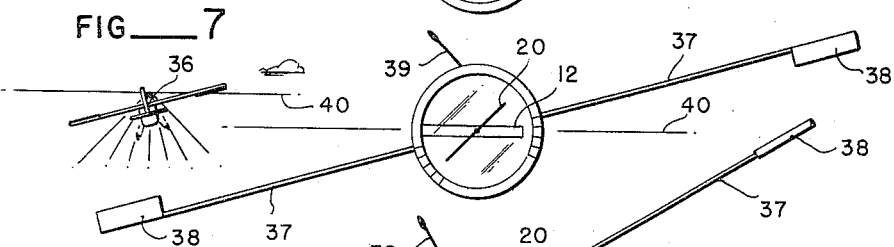
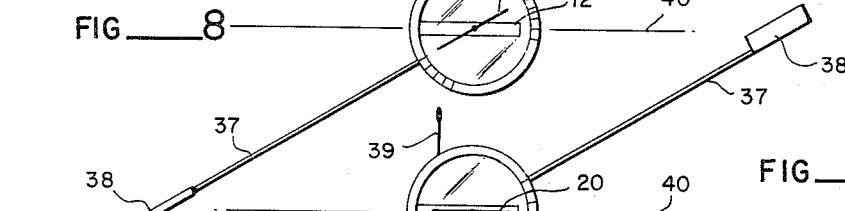
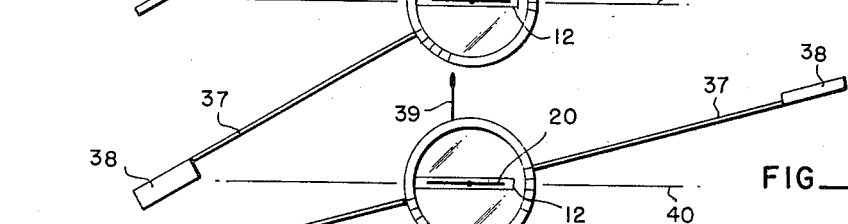
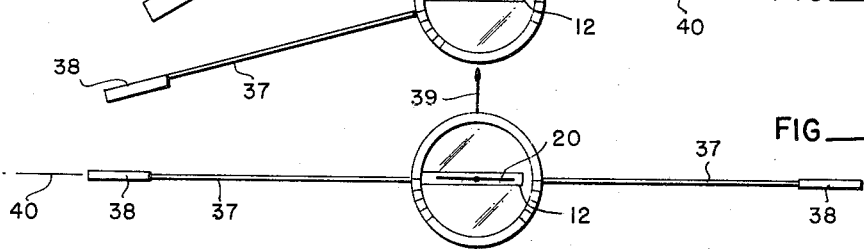
JOHN J. GALLAHER
HERMAN C. GALLAHER
INVENTORS
BY Seed Berry
ATTORNEYS

United States Patent Office 3,228,631
Patented Jan. 11, 1966

3,228,631
CONTROL POSITIONS INDICATOR FOR USE
WITH GYRO INSTRUMENTS
Herman C. Gallaher, Wenatchee, Wash., and John J. Gallaher, Houston, Tex., assignors to Positive Flight Control, Inc., Seattle, Wash., a corporation of Washington, said Herman C. Gallaher and John J. Gallaher, jointly
Filed May 15, 1963, Ser. No. 280,687
13 Claims. (Cl. 244—75)

This invention relates generally to attitude control instruments and more particularly to an instrument adapted to aid a pilot in properly controlling the roll attitude of an airplane as well as the pitch thereof.

In instrument flying, the pilot generally uses an instrument called a "gyro horizon," which provides an artificial horizon in the window of the instrument. A miniature plane is fixedly mounted in the front of the window with its wings always parallel to the wings of the plane itself. When the plane is banked, the miniature plane appears to the pilot to be horizontal and the artificial horizon to be tilted, as the horizon itself would appear to the pilot. If the pilot desires to level the plane from a banked position, he turns the aileron controls in a manner to rotate the plane in a direction opposite to that in which the artificial horizon will rotate in the instrument window as the plane is returning to level flight. When the artificial horizon reaches a position paralleling the wing line of the miniature plane in the window, the plane itself has reached a level position with respect to roll attitude.

It is well known that when a plane is banked so as to travel a curved path, the resultant force of the pull of gravity and of the centrifugal force created by the curved path of the airplane is exerted on a line whose direction is nearly parallel to the vertical axis of the plane itself. Thus, even though the plane may be sharply banked, the pilot has the false sensation that he is in level flight, and the miniature airplane in the instrument seems to be maintaining a level attitude with respect to the earth's gravity, while the artificial horizon appears to be tilted with respect to earth below. The novice in instrument flying sometimes makes the error (as occasionally does the pilot of longer experience) of confusing the attitude of the artificial horizon for the roll attitude of his airplane and in attempting to correct this roll will actually move his controls so as to bank the plane even further. He will not be able to recognize this error until change in roll attitude of the airplane has actually begun so that the artificial horizon can be seen to move to an even greater angle with respect to the miniature plane on the instrument window, the result of this error sometimes being loss of control of the plane.

There is the related problem that even with the pilot turning the controls in the right direction, this pilot, if inexperienced, will tend often to "over-control" the airplane. That is, as the plane approaches level attitude, its momentum will carry beyond a level roll attitude so that the plane becomes banked moderately in the opposite direction. The result is that the novice, while trying to bring his plane to a stable position of level flight, will be operating his controls in a manner to rock his plane about its longitudinal axis.

Accordingly, it is an object of the present invention to provide an instrument which will better enable a pilot to control the attitude of his vehicle.

More particularly, it is an object to provide an instrument especially adapted for use in controlling the roll attitude of an airplane, by which instrument the pilot is readily able to ascertain the proper direction in which to move his controls, and by which the pilot is able to ascertain immediately and continuously the degree to which he should move his controls to properly bring the plane to the desired roll attitude without any "over-control" of the plane.

It is a further object to better enable the pilot to control the pitch, as well as the roll of his airplane.

These and other objects and advantages in view will appear and be understood in the following description and claims, the invention consisting in the novel construction and in the adaptation and combination of parts hereinafter described and claimed.

FIG. 1 is a perspective view of the indicator portion of an instrument embodying preferred teachings of the invention;

FIG. 2 is a front elevational view thereof;

FIG. 3 is a longitudinal sectional view of the front indicator portion of the instrument, taken on line 3—3 of FIG. 2;

FIG. 4 is a perspective view illustrating the invention in operating position in the control system of an airplane, and FIGS. 5–11 are a series of schematic illustrations showing the operation of the invention through conventional banking maneuver of an airplane.

Referring to the accompanying drawings, a gyro horizon of conventional design is shown schematically at 10. The housing 11 of this instrument contains a gyroscope (not shown) which is operatively connected to a horizon bar 12 mounted in the front portion 13 of this gyro horizon, the horizon bar being ordinarily referred to as the "artificial horizon." The operation of the gyro horizon is such that regardless of the roll attitude of the airplane, the artificial horizon 12 remains parallel to the earth's horizon and either drops or rises in the instrument window depending on whether the airplane is in a climbing or descending attitude.

Our invention provides a circular transparent indicator plate 14 fixedly secured to a border frame 15 and rotatably mounted at the front of the gyro horizon at a location where the window thereof would ordinarily be placed. This mounting conveniently is accomplished with a mounting sleeve 16 screwed at 17 to the front of the gyro horizon and extending forwardly a short distance therefrom, where it terminates in an inturned circumferential lip 18 to engage the frame 15 to hold the indicator plate 14 in front of the artificial horizon 12. Angular markings 19 are provided at fixed locations along the front peripheral portion of the gyro horizon (as on the lip 18) to indicate the horizontal transverse axis of the airplane and various angular positions with respect thereto. Marked across the face of this plate 14 and through the approximate center thereof is a reference line 20 whose angular position corresponds to the position of the aileron controls of the airplane.

This latter function is readily accomplished by forming the peripheral frame 15 of the indicator plate 14 with a circumferential groove 21 to accommodate a control cable 22 which is looped one or more times about the circumference of the plate so as to frictionally engage the same. Each side of the cable loop reaches away from the groove 21 of the plate at the upper portion thereof each to train over a respective guide pulley 23—23 and into a flexible tube 24, then to circle around an instrument control pulley 26.

This control pulley 26 is connected by a belt 27 to another pulley, such as the one shown at 28, this latter pulley being part of a conventional aileron control mechanism used in smaller aircraft. This aileron control mechanism, as shown herein in FIG. 4, comprises a set of steering handles, one of which is shown at 30, the shafts 31 for which engage through a chain and sprocket mechanism 32 an aileron control cable 33. This cable loops about this pulley 28 and trains about guide pulleys 34 and then operatively engages each of the ailerons (not shown) of the airplane. Thus it can readily be seen that when either of the control handles 30 are turned so as to rotate the pulley 28 and move the ailerons of the airplane by means of cable 33, the belt 27 also turns the instrument control pulley 26 to cause a corresponding rotation of the indicator plate 14. It is to be understood, of course, that our invention can be applied equally well to other such types of control apparatus, and that means other than the control cable mechanism shown herein may be used to make the indicator plate 14 responsive to the aileron controls, without departing from the broader aspects of our invention.

Control of the elevators of the plane is accomplished in a conventional manner by journaling the shafts 31 of the handles 30 in a cross bar 41 which is fixed to a post 42. This post is swing mounted by its lower end about a transverse horizontal axis to the frame 43 of the airplane as by pins 44. The extreme lower end of the post is connected to the elevators (not shown) through a cable 45 in a manner that by moving the handles 30 forward or backward, the plane is caused to be placed in a descending or climbing attitude.

FIGS. 5 through 11 illustrate schematically the operation of the invention in an airplane making a conventional turn. For clarity, FIGS. 5 and 7 are supplemented with sketches showing at 36 an airplane at the roll attitude indicated in its corresponding schematic drawing. In this series of figures, the wings and ailerons only of the airplane are shown schematically at 37 and 38, respectively, with the instrument being shown in enlarged scale at the center of the wings and being at its proper roll attitude with respect thereto. The aileron controls are for convenience represented by a control stick 39, and the true horizon is indicated by line 40.

In FIG. 5, the plane is shown flying with its roll attitude being horizontal, and the aileron control stick 39 being in neutral position so as to maintain this attitude. To initiate a left turn, the pilot pushes the control stick to the left so that the ailerons 38 move to the position shown in FIG. 6 to cause the plane to begin to bank left. It will be noted that while the artificial horizon 12 is at this time horizontal with respect to the attitude of the plane and consequently of the pilot himself, the indicator plate 14 with its aileron reference line 20 has immediately rotated to an angle with respect to the artificial horizon.

When the plane has gone half way into its full banking attitude, as shown in FIG. 7, or moderately beyond this point, the pilot will begin to move his control stick toward its neutral position, to reduce the angle of the ailerons 38 with respect to the line of flight. When the plane has reached its desired banking position, as shown in FIG. 8, the pilot by this time has moved the control stick to a neutral position so that the plane will maintain this roll attitude. It is important to take note of the fact that with the plane making a turn in this banking position, the pilot has the false sensation (because of the centrifugal force of the plane making a turn) that both he and the plane are level with the earth's horizon and that the artificial horizon 12 of the instrument panel is tilted with respect to the true horizon. Under these conditions, the novice sometimes makes the mental error of confusing the attitude of the artificial horizon 12 with the attitude of the plane and assumes that his roll attitude is, as, for example, in the present instance to the right instead of to the left. Acting on this erroneous impression, he will bank the plane further to the left, in attempting to bring the plane back to level.

In the practice of the invention, however, to bring the roll attitude of the plane back to level, the pilot follows one simple rule, that is, "to immediately bring the aileron reference line 20 parallel to the artificial horizon 12 and hold it there." Thus, to bring the plane back to level, the pilot moves his stick 39 in the manner illustrated in FIG. 9, so as to bring the aileron reference line 20 parallel to the horizon bar 12. As the plane is returning to level, the pilot smoothly moves his control stick 39 toward neutral in a manner to keep the artificial horizon 12 and aileron reference line 20 parallel, as shown in FIG. 10. By the time the airplane has reached level roll attitude, as shown in FIG. 11, the aileron control stick has been moved to the neutral position, with the plane proceeding on level flight.

With regard to the latter part of the above maneuver (i.e. returning the plane to level roll attitude), it is important to note that the pilot, by keeping the aileron reference line 20 parallel with the artificial horizon 12 is assured that not only is he turning his aileron controls in the right direction, but also that he is bringing his plane back to level attitude in as smooth a manner as possible, and in a manner to prevent any "over control." Thus it will be readily appreciated that not only does this invention have value in instrument flying where the earth's horizon is not visible but also as an aid to teach the student how to properly execute a banking maneuver.

The operation of the invention has been here illustrated with the plane executing a turn while in level flight, and the artificial horizon 12, though moving angularly with respect to the gyro horizon 10, has remained centrally located in the front portion thereof. Of course, if the plane is in a climbing or descending attitude in addition to being banked, the artificial horizon will be moved vertically as well as angularly with respect to the gyro horizon.

Assuming under this circumstance that the pilot wishes to bring his plane back to level flight, the pilot immediately moves his aileron controls from the position shown in FIG. 8 to that shown in FIG. 9. Because of the pitch of the airplane, the artificial horizon 12 will not as in FIG. 9, be coinciding with the aileron reference line 20, but will be parallel with this line and spaced therefrom. The pilot, while keeping these two lines parallel so as to bring the roll attitude back to level, will also operate his elevator controls so as to move the two lines closer together so that when they coincide, the pitch of the airplane will be level. Thus the line 20 also provides a very convenient reference for ascertaining and controlling the pitch of the plane.

For simplicity, no discussion of the operation of the other controls of the airplane has been included, it being understood that in executing these maneuvers, the pilot would be making other observations and performing operations in addition to those described herein.

It is thought that the invention will have been clearly understood from the foregoing detailed description. Changes in the details of construction will suggest themselves and may be resorted to without departing from the spirit of the invention, wherefore it is our intention that no limitations be implied and that the hereto annexed claims be given a scope fully commensurate with the broadest interpretation to which the employed language admits.

We claim:

1. In combination, pilot operated control means to control the attitude of a vehicle, reference means to indicate a reference axis with respect to which the attitude of said vehicle is to be controlled, said reference means including mechanism to maintain said reference axis in a fixed position of reference, and control indicating means connected to said control means so as to move in the same direction as the vehicle is to be moved and associated with said reference means in a manner to indicate the correct functional position of said control means in relation to the vehicle's attitude to properly bring the attitude of said vehicle into conformity with said reference axis, whereby proper pilot control of said vehicle may be accomplished by operating said control means so as to maintain said control indicating means in proper conformity with said control reference means.

2. The combination as recited in claim 1, wherein said reference means is a gyroscope mechanism indicating a reference axis.

3. The combination as recited in claim 1, wherein said reference means is a gyroscope mechanism indicating an artificial horizon and said control indicating means provides a visual control position indicator so associated with said artificial horizon whereby said indicator may visually be made to correspond with said artificial horizon to accomplish proper attitude control.

4. In an airplane, aileron controls to determine the roll of said airplane, a gyroscope mechanism to indicate a reference axis related to the airplane's roll, aileron control indicating means connected to the aileron controls so as to move in the same direction as the vehicle is to be moved and associated with said gyroscope mechanism in a manner to indicate the correct functional position of said aileron controls to properly bring the roll of the airplane into proper conformity with said reference axis, whereby proper pilot control may be accomplished by operating the aileron controls so as to maintain said control indicating means in proper conformity with said reference axis.

5. The apparatus as recited in claim 4, wherein said control indicating means comprises a visual indicator having line indicating means whose angular displacement corresponds to the degree which said aileron controls are moved from a neutral position, so that proper pilot control may be accomplished by operating the aileron controls in a manner to maintain said line indicating means in desired alignment with said reference axis.

6. In an airplane having aileron controls and a gyroscope mechanism which provides an artificial horizon according to which the roll of said airplane is determined, aileron control indicating means being responsive to said aileron controls in a manner that angular displacement of said means corresponds to the degree which said aileron controls are moved from a neutral position, said angular displacement being such in relation to said artificial horizon that proper pilot control is accomplished by operating the aileron controls in a manner to maintain the angular position of said indicating means in correspondence with said artificial horizon.

7. The device as recited in claim 6, wherein said control indicating means is superimposed over said artificial horizon which moves in a general plane, and rotatable about an axis generally perpendicular to the plane within which said artificial horizon moves, said control indicating means having line indicating means thereon by which said control indicating means may be visually aligned with said artificial horizon.

8. The device as recited in claim 7, wherein said control indicating means comprises a transparent plate mounted on a display face of said gyroscope mechanism.

9. The device as recited in claim 8, wherein said plate is operatively connected by cable means to said aileron controls in a manner that movement of said aileron controls causes rotation of said plate.

10. In an airplane having aileron controls and a gyro horizon which provides an artificial horizon according to which the roll of said airplane is determined, an indicating plate mounted on the front of said gyro horizon in proximity to said artificial horizon for rotation in a plane approximately parallel to that in which the artificial horizon moves, a cable engaging said plate and being operatively connected to the aileron controls of said airplane in a manner that movement of said aileron controls to move the plane about its longitudinal axis will cause the plate to rotate in the same direction as the plane is to be moved, said plate having a reference line passing through the approximate center of said plate and so located as to be level with the horizontal axis of the airplane when the aileron controls are in neutral position, whereby the airplane can be brought from a banked position back to level by operating said aileron controls so as to align said reference line with said artificial horizon.

11. In combination, pilot operated means to control the attitude of a vehicle, a gyroscope mechanism indicating an artificial horizon with respect to which the attitude of said vehicle is to be controlled, and a visual control position indicator superimposed over said artificial horizon and responsive to the functional position of said control means, said indicator means providing line indicating means which is angularly displaced in accordance with the degree to which said control means is moved from a neutral position and which is thus visually aligned with respect to said artificial horizon by bringing the control means into proper functional position to move the vehicle to its proper attitude, whereby proper pilot control of said vehicle may be accomplished by operating said control means so as to maintain said visual control indicator in proper conformity with said artificial horizon to accomplish proper attitude control.

12. In an airplane having pilot operated controls and a gyro horizon which provides an artificial horizon according to which the roll of said airplane is determined, an indicating plate mounted on the front of said gyro horizon in proximity to said artificial horizon for rotation in a plane approximately parallel to that in which the artificial horizon moves, means connected to said plate and being operatively connected to the pilot operated controls in a manner that movement of said controls to move the plane about its longitudinal axis will cause the plate to rotate in the same direction as the plane is to be moved, said plate having a reference line passing through the approximate center of said plate and so located as to be level with the horizontal axis of the plane when the controls are in neutral position, whereby the plane can be brought from a banked position back to level by operating said controls so as to align said reference line with said artificial horizon.

13. In combination, pilot operated means to control the attitude of a vehicle, a gyro horizon providing an artificial horizon for determining the roll of the vehicle, a visual indicator means superimposed on said artificial horizon, means connecting said indicator means to said control means in a manner that movement of said control means to move the vehicle about its longitudinal axis will cause the indicator means to rotate in the same direction as the vehicle is to be moved, said indicator means including a reference line so located as to coincide with the horizontal axis of the vehicle when the control means is in a neutral position, whereby said control means may be operated so as to maintain said indicator in proper conformity with said artificial horizon to accomplish attitude control of the vehicle.

References Cited by the Examiner
UNITED STATES PATENTS

| | | | |
|---|---|---|---|
| 1,497,059 | 6/1924 | Bates | 33—224 |
| 2,823,464 | 2/1958 | Snodgrass | 33—204 |
| 3,111,105 | 11/1963 | Bentkowsky et al. | 114—144 |

MILTON BUCHLER, *Primary Examiner.*

ANDREW H. FARRELL, *Examiner.*